E. S. ROBINSON.
BRAKE.
APPLICATION FILED JUNE 3, 1913.

1,092,746.

Patented Apr. 7, 1914.
2 SHEETS—SHEET 1.

Witnesses:
Christ Feinle, Jr.
P. M. Smith.

Inventor,
E. S. Robinson.
By Victor J. Evans,
Attorney.

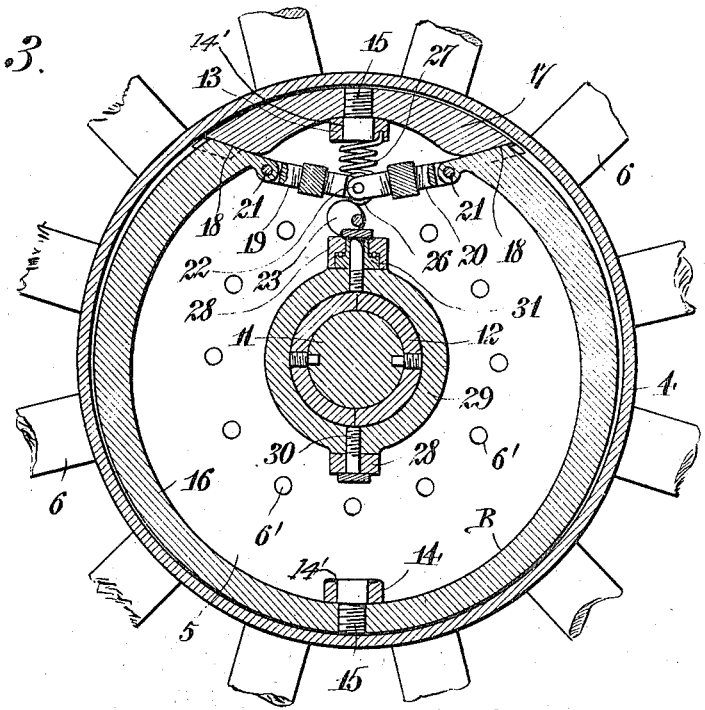

UNITED STATES PATENT OFFICE.

EDWARD S. ROBINSON, OF OROVILLE, CALIFORNIA, ASSIGNOR TO GOLDEN WEST MOTORS COMPANY, OF SACRAMENTO, CALIFORNIA, A CORPORATION OF CALIFORNIA.

BRAKE.

1,092,746.          Specification of Letters Patent.          Patented Apr. 7, 1914.

Application filed June 3, 1913. Serial No. 771,488.

*To all whom it may concern:*

Be it known that I, EDWARD S. ROBINSON, a citizen of the United States, residing at Oroville, in the county of Butte and State of California, have invented new and useful Improvements in Brakes, of which the following is a specification.

This invention relates to brakes of the class generally used upon automobiles, motor trucks and other motor driven vehicles, the object in view being to provide what is known as an internal expanding brake which operates in conjunction with a brake drum carried by and having a fixed relation to one of the wheels of the machine.

The main object of the invention is to provide, in connection with a brake drum related to the wheel in the manner above stated, novel means for supporting and admitting of the necessary movements of the expanding brake band, said supporting means for the brake band being formed on the housing of the axle, by which the adjacent wheel is geared or driven.

A further object of the invention is to so support the brake band that it is capable of turning on the same axial center as the wheel, thereby making the brake as a whole effective, irrespective of the angle taken by the wheel in the operation of steering the wheel.

With the above and other objects in view, the invention consists in the construction, combination and arrangement of parts, as will be hereinafter more fully described, illustrated in the accompanying drawings, and pointed out in the claims hereunto appended.

Figure 1:
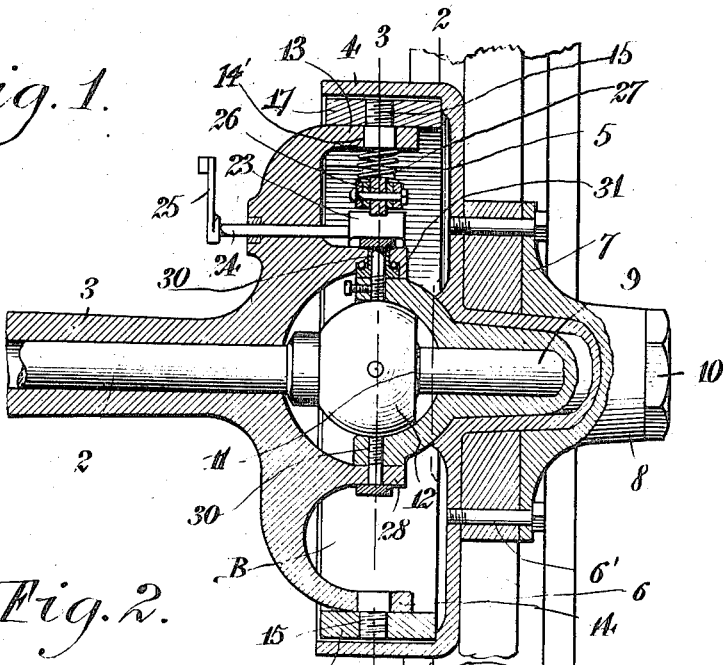
Figure 2:
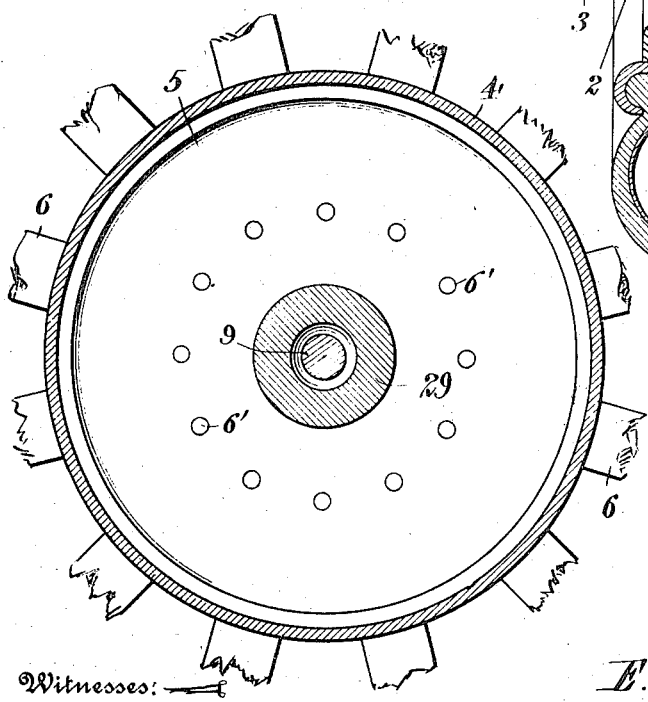

In the drawings: Figure 1 is a vertical section showing the brake of this invention used in connection with one of the wheels of a vehicle. Fig. 2 is a vertical section on the line 2—2 of Fig. 1, looking toward the center of the machine. Fig. 3 is a vertical section on the line 3—3 of Fig. 1. Fig. 4 is a diametrical section through the mechanism.

Referring to the drawings, 1 designates one of the wheels of an automobile, motor truck, or other motor driven vehicle, and 2 the axle which is shown as having a driving connection with said wheel, the axle 2 being mounted in a housing 3.

Secured in fixed relation to the wheel 1 and arranged on the inner side thereof is a brake drum comprising the rim 4, and body or web 5, the latter being shown as having the spokes 6 of the wheel fastened thereto by means of bolts 6' which also pass through the flange 7 of a hub cap 8, the hub being shown as fastened on the spindle 9 by means of a cap nut 10. The spindle 9 and the axle 2 are shown as coupled together by means of a ball and socket coupling, embodying the ball member 11 and socket member 12. This forms a universal joint between the axle 2 and the spindle 9, by means of which the motion of the axle 2 is transmitted to the spindle 9, while at the same time permitting the turning of the wheel 1 in the operation of steering the machine.

In carrying out this invention, the axle housing 3 is provided with two band supporting arms 13 and 14 arranged one above the other, as shown in Fig. 1, each of said arms 13 and 14 being provided with a hole 14' to receive a pintle 15 which extends radially from one of the brake band sections with respect to the axis of the wheel, said pintles being located in line with the pivotal connection between the axle 2 and the spindle 9. Extending around and supported upon and by the arms 13 and 14 is an expanding brake band B, said band being of sectional construction, as shown in Fig. 3, 16 designating the larger and longer section of the band, and 17 a relatively shorter section, the extremities of the two sections 16 and 17 abutting on oblique lines 18, whereby in the expanding action of the section 16, the extremities of the last-named section act with a wedging effect on the abutting extremities of the smaller section 17, thereby causing a simultaneous outward or expansive movement of the section 17.

In order to expand the brake band B, I employ a pair of links 19 and 20 pivotally connected to the larger band section 16, at 21, the inner ends of said links being pivotally connected together by a bolt or pin 22. Each of said links 19 and 20 is preferably made in the form of a turn-buckle, so that it may be lengthened and shortened to compensate for wear and to provide the necessary expansion and contraction of the brake band to move the outer face thereof into frictional contact with the inner face of the brake drum. The pintles 15 admit of the expansion of the brake band, while at the same time insuring the holding of the brake band in fixed relation to the axle housing 3.

23 designates a cam or eccentric which is provided with an operating shaft 24 having an arm 25, from which a suitable rod or other connection is adapted to extend to the manually controlled brake lever within reach of the driver of the machine. The cam or eccentric 23 coöperates with a roller 26 on the rod or pin 22, above referred to, serving to move said pin outwardly toward the periphery of the drum, causing the links to expand the sectional brake band. A spring 27 acts in opposition to the cam 23 to force the pin 22 inwardly and release the brake, after the brake lever is released. In addition to the arms 13 and 14, the axle housing 3 is provided with another set of knuckle supporting arms 28, between which is pivotally mounted the knuckle 29, said knuckle being pivoted, at 30, in the arms 28, the last-named pivots being located in line with the pintles 15, hereinabove described. By reason of this arrangement of parts, when the wheel 1 is turned for the purpose of steering the machine, a simultaneous turning of the brake band B is effected, thus preserving the proper relationship between the brake band and the brake drum, and enabling the brake to be applied, irrespective of the angle assumed by the wheel.

A ball bearing 31 is preferably arranged in the upper arm 28, so as to carry the weight of the machine on the knuckle 29 to enable the wheel to be turned with greater ease and with a minimum amount of friction.

From the foregoing description, it will be seen that the brake band is effectively supported by the axle housing and thoroughly braced relatively to said housing, the construction referred to also serving as an effective brace for the hub of the wheel, the inner face of said hub bearing directly along the line 33 against the adjacent outer face of the knuckle 29, as shown in Fig. 1.

What is claimed is:

1. In brake mechanism for motor vehicles, a driving axle, an axle housing, a wheel driving spindle, a universal joint between said axle and spindle, a driving and steering wheel on said spindle, a brake drum fast on said wheel, upper and lower brake band supporting arms on said axle housing in spaced relation to each other and formed with pintle holes extending in a common diametrical line, an internal expanding brake band supported by said arms, pintles on said brake band slidable in said holes in the supporting arms and upon which pintles as a center the brake band is adapted to turn, and means for operating said brake band.

2. In brake mechanism for motor vehicles, a driving axle, an axle housing, a wheel driving spindle, a universal joint between said axle and spindle, a driving and steering wheel on said spindle, a brake drum fast on said wheel, upper and lower brake band supporting arms on said axle housing in spaced relation to each other and formed with pintle holes extending in a common diametrical line, an internal expanding brake band supported by said arms, pintles on said brake band slidable in said holes in the supporting arms and upon which pintles as a center the braking band is adapted to turn, and means for operating said brake band, said brake band embodying a plurality of sections one of which has a wedging action directly against the adjoining section.

3. In braking mechanism for motor vehicles, an axle housing, a wheel driving spindle, a universal joint between said axle and spindle, a driving and steering wheel on said spindle, a brake drum fast on said wheel, upper and lower brake band supporting arms on said axle housing in spaced relation to each other, an internal expanding brake band supported by said arms, pintles connecting said brake band and arms at diametrically opposite points, permitting the band to turn on said pintles as a center and also slide radially with respect to the center of the wheel, pivotally connected links having a jointed connection with said band for expanding the latter into contact with the drum, a roller on the pivot connecting said links, and a manually operated eccentric bearing against said roller.

4. In braking mechanism for motor vehicles, an axle housing, a wheel driving spindle, a universal joint between said axle and spindle, a driving and steering wheel on said spindle, a brake drum fast on said wheel, upper and lower brake band supporting arms on said axle housing in spaced relation to each other, a sectional internal expanding brake band supported by said arms, pintles on the sections of said brake band connecting said brake band and arms at diametrically opposite points, permitting the band to turn on said pintles as a center and also slide radially with respect to the center of the wheel, pivotally connected links having a jointed connection with said band for expanding the latter into contact with the drum, a roller on the pivot connecting said links, a manually operated eccentric bearing against said roller, and a band contracting spring interposed between one of said supporting arms and the point of junction of said links and acting directly upon said links.

5. A brake for motor driven vehicles comprising in combination with a steering wheel, a driving axle for said wheel, a wheel spindle connected with said axle by a universal joint, a housing for said axle, upper and lower arms on said housing in spaced relation to each other, a brake drum carried by said wheel, an internal expanding brake band supported by said arms and mounted thereon to turn on the same axis as the steering wheel, means for expanding said brake band into engagement with said drum, upper and lower knuckle supporting arms on said housing, and a steering wheel knuckle pivotally supported by the last-named arms to turn on the same axis as the brake band.

In testimony whereof I affix my signature in presence of two witnesses.

EDWARD S. ROBINSON.

Witnesses:
 FRANK G. MOONEY,
 K. M. ROBINSON.